(12) United States Patent
Alonso Alonso et al.

(10) Patent No.: US 11,358,550 B2
(45) Date of Patent: Jun. 14, 2022

(54) VEHICLE PEDAL ARRANGEMENT

(71) Applicant: BATZ, S.COOP., Igorre (ES)

(72) Inventors: Arturo Alonso Alonso, Bilbao (ES); Egoitz Anzola Artabe, Bilbao (ES); Iker Totorika Txurruka, Durango (ES)

(73) Assignee: BATZ, S.COOP., Igorre (ES)

( * ) Notice: Subject to any disclaimer, the term of this patent is extended or adjusted under 35 U.S.C. 154(b) by 0 days.

(21) Appl. No.: 17/201,082

(22) Filed: Mar. 15, 2021

(65) Prior Publication Data

US 2021/0291772 A1    Sep. 23, 2021

(30) Foreign Application Priority Data

Mar. 23, 2020  (EP) ..................................... 20382217

(51) Int. Cl.
| | | |
|---|---|---|
| *B60R 21/09* | (2006.01) | |
| *G05G 1/327* | (2008.04) | |
| *G05G 1/44* | (2008.04) | |
| *B60K 23/02* | (2006.01) | |
| *B60R 21/00* | (2006.01) | |
| *B60T 7/06* | (2006.01) | |

(52) U.S. Cl.
CPC ............ *B60R 21/09* (2013.01); *G05G 1/327* (2013.01); *G05G 1/44* (2013.01); *B60K 23/02* (2013.01); *B60K 2023/025* (2013.01); *B60R 2021/0004* (2013.01); *B60T 7/065* (2013.01)

(58) Field of Classification Search
CPC ........... B60R 21/09; B60T 7/065; G05G 1/32; G05G 1/323; G05G 1/327
See application file for complete search history.

(56) References Cited

U.S. PATENT DOCUMENTS

| | | | |
|---|---|---|---|
| 10,703,346 B2* | 7/2020 | Hwang | ..................... G05G 1/32 |
| 11,009,903 B1* | 5/2021 | Kim | .......................... G05G 1/46 |
| 2009/0250285 A1 | 10/2009 | Allen | |

(Continued)

FOREIGN PATENT DOCUMENTS

| | | |
|---|---|---|
| DE | 202005008223 U1 | 7/2005 |
| EP | 1260419 A1 | 11/2002 |

(Continued)

OTHER PUBLICATIONS

Extended European Search Report received in EP application No. 20382217.6, dated May 15, 2020 (6 pages).

*Primary Examiner* — Richard W Ridley
*Assistant Examiner* — Brian J McGovern
(74) *Attorney, Agent, or Firm* — Edell, Shapiro & Finnan, LLC

(57) ABSTRACT

A vehicle pedal arrangement according to one embodiment includes a support, a rotating shaft, a pedal that is pivotable with respect to the rotating shaft, a retention member and actuating means. The pedal includes a retaining housing and an opening, such that under normal operating conditions the rotating shaft is arranged in the opening and the retention member is at least partially housed in the retaining housing supported against the rotating shaft, retaining the rotating shaft in the opening. In the event of a head-on collision, the actuating means moves the retention member such that the pedal is no longer retained against the rotating shaft.

20 Claims, 14 Drawing Sheets

(56) References Cited

U.S. PATENT DOCUMENTS

| | | | |
|---|---|---|---|
| 2013/0087010 A1* | 4/2013 | Kapocs | B60R 21/09 74/560 |
| 2013/0125698 A1* | 5/2013 | Burguera Albizuri | G05G 1/32 74/560 |
| 2013/0133472 A1* | 5/2013 | Burguera Albizuri | G05G 1/506 74/560 |
| 2019/0322250 A1* | 10/2019 | Jarjoura | G05G 1/44 |
| 2020/0017054 A1* | 1/2020 | Amirian | G05G 1/32 |
| 2020/0339078 A1* | 10/2020 | Vanheule | G05G 1/323 |
| 2021/0276516 A1* | 9/2021 | Kim | B60T 7/042 |

FOREIGN PATENT DOCUMENTS

| | | | | |
|---|---|---|---|---|
| EP | 2594440 A1 | 5/2013 | | |
| WO | WO-2014092621 A * | 6/2014 | ............ | B60R 21/09 |
| WO | WO-2014193276 A1 * | 12/2014 | ............ | B60R 21/09 |

\* cited by examiner

VEHICLE PEDAL ARRANGEMENT

CROSS-REFERENCE TO RELATED APPLICATIONS

This application relates to and claims the benefit and priority to European Application No. EP20382217.6, filed Mar. 23, 2020.

FIELD

The present invention relates to a vehicle pedal arrangement.

BACKGROUND

Pedals for motor vehicles comprising safety mechanisms that are only activated in the event of a head-on collision are known. The objective of these safety mechanisms is to prevent the vehicle driver's lower limbs from being injured when a head-on crash occurs, preventing for that purpose the pedal from suddenly moving towards the driver. In a head-on collision, the wall to which the pedals are connected deforms, pushing the support structure of the pedals and the pedals themselves against the driver. In response to this situation, the safety mechanism is activated to prevent the pedals from impacting against the driver's lower limbs.

EP2594440A1 describes a pedal comprising a support configured for being fixed to the vehicle, a pedal including a rotating shaft, a retention member which, under normal operating conditions, retains the rotating shaft such that the pedal can pivot with respect to the support around the rotating shaft, and actuating means which, in the event of a head-on collision, move the retention member such that the pedal is released. The support comprises a retaining housing and an opening, such that under normal operating conditions, the rotating shaft is arranged in the opening and the retention member is partially housed in the retaining housing.

SUMMARY

The pedal arrangements of the invention comprise a support configured for being fixed to a vehicle, a rotating shaft coupled to the support, and a pedal comprising a first end and a second end, the first end comprising a shoe.

The pedal arrangements also comprise a retention member which, under normal operating conditions, retains the pedal in the support such that it can pivot with respect to the support on the rotating shaft, and actuating means which, in the event of a head-on collision, moves the retention member, at least partially releasing the pedal of the support.

Under normal operating conditions the retention member retains the pedal against the rotating shaft, such that when the actuating means moves the retention member the pedal is no longer retained against the rotating shaft.

The pedal comprises at the second end a retaining housing and an opening, such that under normal operating conditions, the rotating shaft is arranged in the opening and the retention member is at least partially housed in the retaining housing supported against the rotating shaft, retaining the rotating shaft in the opening.

The fact that it is the pedal which comprises the retaining housing for the retention member and the opening for the rotating shaft, offers a more flexible solution for designing the pedal arrangement than when the retaining housing and the opening are arranged in the support of the pedal arrangement, because since the support is a part which must be fixed to the structure of the vehicle, it has to meet certain criteria in regard to materials and other limitations in vehicles.

Furthermore, the pedal arrangement of the invention has a simple configuration compared with other pedal assemblies with a safety mechanism for head-on collisions known in the state of the art, comprising a smaller number of parts and the mechanism for at least partially releasing the pedal in the event of a head-on collision being simpler. In the event of a head-on collision, after the activation of the actuating means, the retention member is moved guided by the retaining housing of the pedal, without the need to use rotating retaining elements as is common in pedal assemblies of the state of the art.

These and other advantages and features will become apparent in view of the figures and the detailed description.

DETAILED DESCRIPTION

Figure 1:
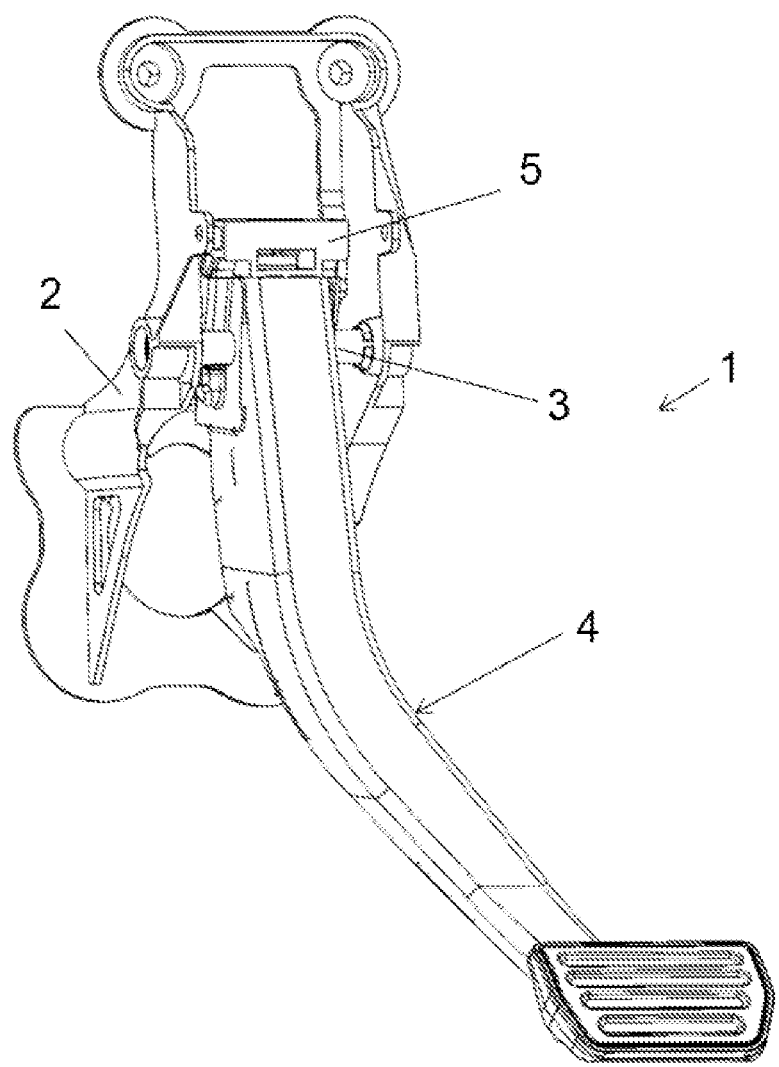
FIG. 1 shows a perspective view of a pedal arrangement according to a first embodiment of the invention, with the pedal arrangement being under normal operating conditions.

FIGS. 1 to 11 show a pedal arrangement 1 for motor vehicles according to a first embodiment. FIGS. 12 to 18 show a pedal arrangement 1' for motor vehicles according to a second embodiment. Preferably the pedal arrangement 1, 1' is configured for being coupled by means of a rod (not shown in the figures) to a servo brake or to a clutch cylinder.

The pedal arrangement 1, 1' comprises actuating means which, in the event of a head-on crash in the vehicle comprising the pedal arrangement 1, 1', at least partially release the pedal 4, 4' preventing it from suddenly moving towards the driver's lower limbs. Therefore, in the context of the invention the pedal arrangement 1, 1' will be considered to be under normal operating conditions provided that the actuating means has not at least partially released the pedal 4, 4'. When the pedal arrangement 1, 1' is under normal operating conditions, it is fully operative, where the pedal 4, 4' can pivot between a standby position P1 and a final position P3. Preferably, after the actuating means is activated, the pedal arrangement 1 is partially operative, where the pedal 4 can pivot between a safety position P2 (located in a position farther away from the driver's lower limbs than the standby position P1) and a final position P3. Alternatively, after the actuating means is activated, the pedal arrangement 1' is inoperative, with the pedal 4' being released from the rest of the pedal arrangement 1'.

The pedal arrangement 1, 1' of the invention comprises a support 2, 2' configured for being fixed to a vehicle and a rotating shaft 3, 3' coupled to the support 2, 2'.

The pedal arrangement 1, 1' also comprises a pedal 4, 4' comprising a first end 4a, 4a' and a second end 4b, 4b', the first end 4a, 4a' comprising a shoe 45, 45'.

Furthermore, the pedal arrangement 1, 1' comprises a retention member 5, 5' which, under normal operating conditions, retains the pedal 4, 4' in the support 2, 2' such that it can pivot with respect to the support 2, 2' on the rotating shaft 3, 3'. Namely, under normal operating conditions the retention member 5, 5' retains the pedal 4, 4' against the rotating shaft 3, 3', with the rotating shaft 3, 3' in turn being coupled to the support 2, 2', such that the retention member 5, 5' retains the pedal 4, 4' in the support 2, 2' indirectly.

The pedal arrangement 1, 1' also comprises actuating means which, in the event of a head-on collision, moves the retention member 5, 5', at least partially releasing the pedal 4, 4' from the support. Namely, when the actuating means move the retention member 5, 5', the pedal 4, 4' is no longer retained against the rotating shaft 3, 3'.

Figure 7:
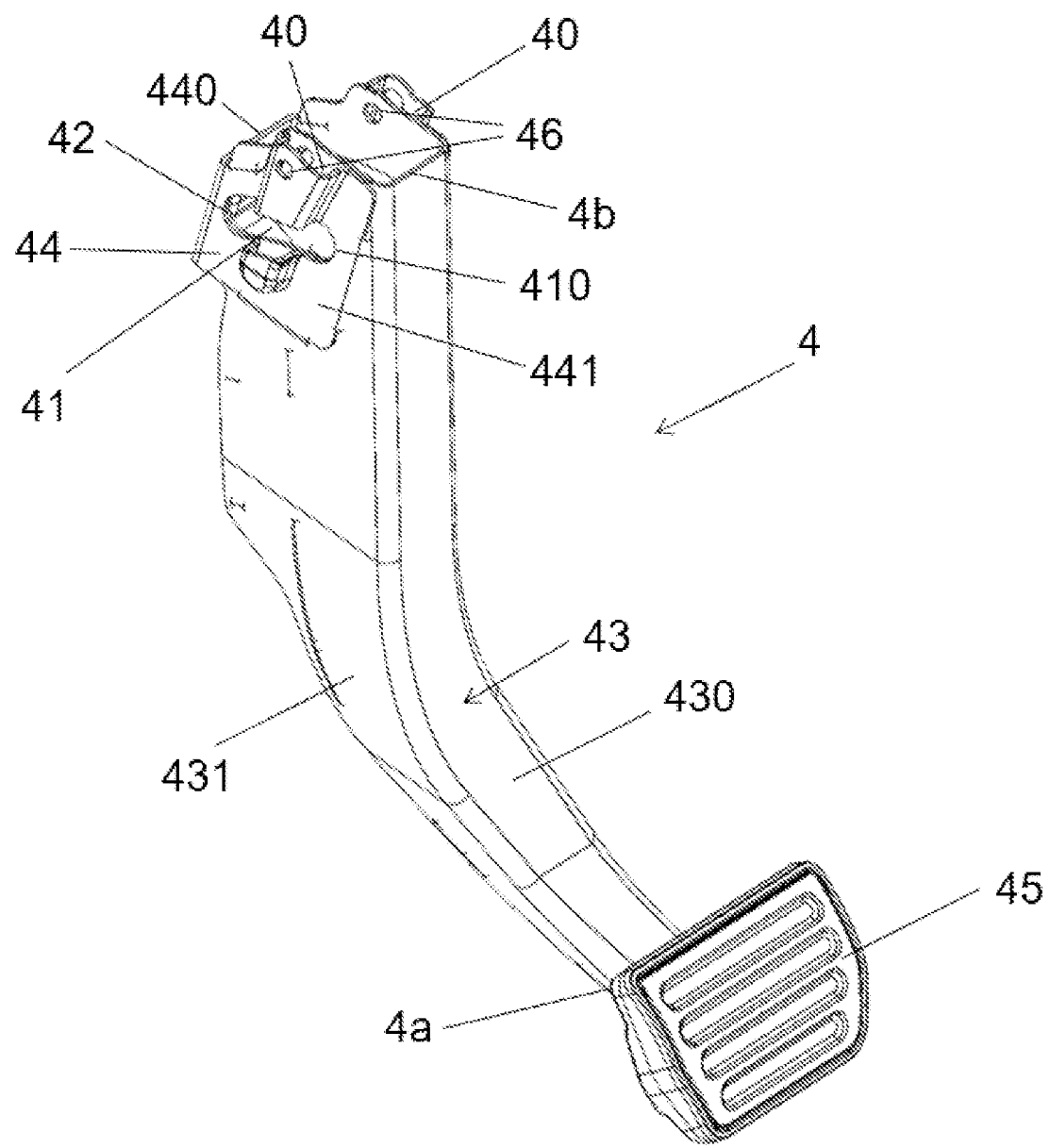
FIG. 7 shows a perspective view of the pedal of the pedal arrangement of FIG. 1.
Figure 13:
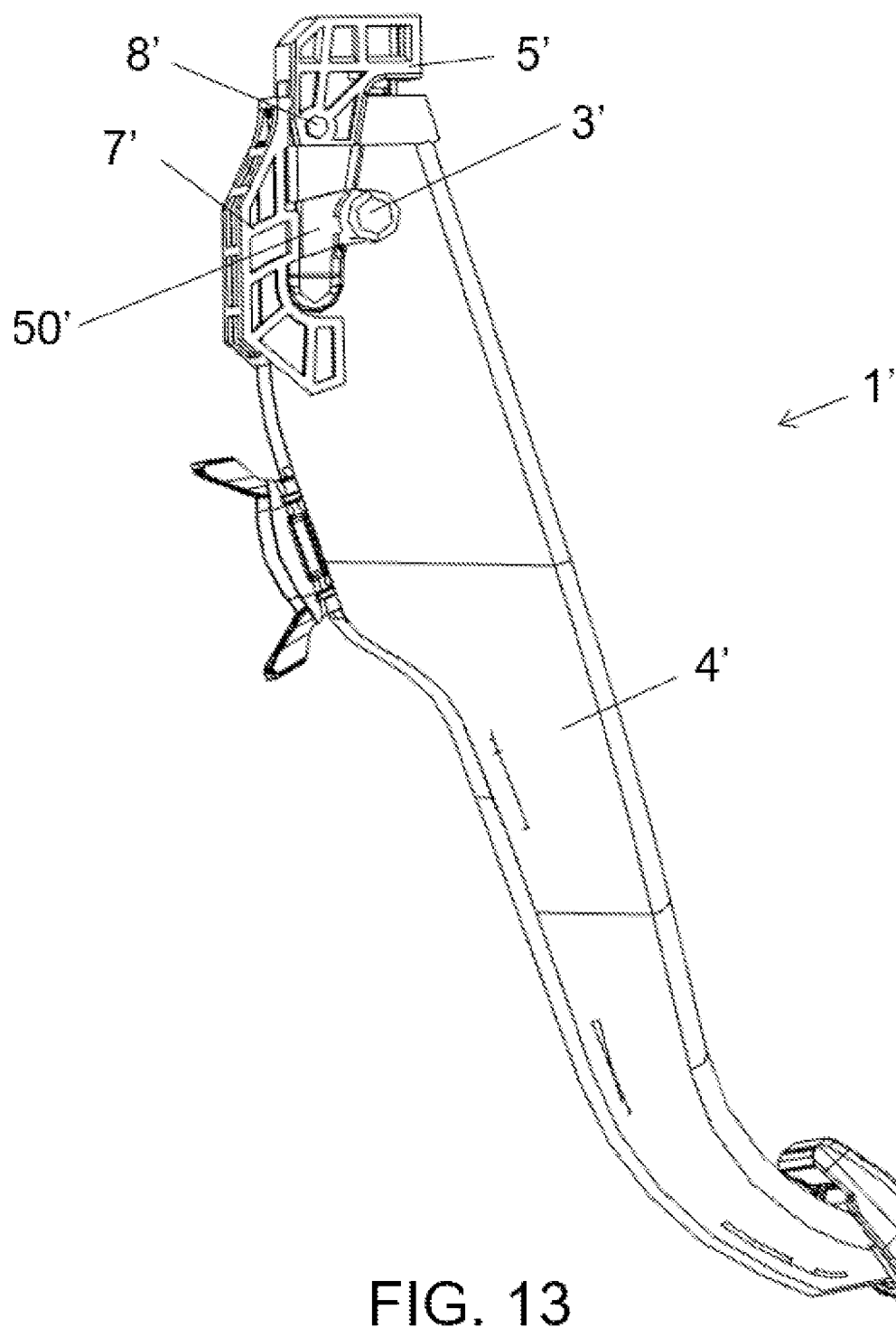
FIG. 13 shows a partial perspective view of the pedal arrangement of FIG. 12, with the pedal arrangement being under normal operating conditions.

The pedal 4, 4' comprises at the second end 4b, 4b' a retaining housing 40, 40' and an opening 41, 41'. Under normal operating conditions, the rotating shaft 3, 3' is arranged in the opening 41, 41' and the retention member 5, 5' is at least partially housed in the retaining housing 40, 40' supported against the rotating shaft 3, 3', retaining the rotating shaft 3, 3' in the opening 41, 41'. The opening 41, 41' and the retaining housing 40, 40' of the pedal 4, 4' are thereby communicated and cooperate for retaining the rotating shaft 3, 3' under normal operating conditions, as shown in FIGS. 7 and 13, for example. Therefore, when the retention member 5, 5' is arranged housed in the retaining housing 40, 40' of the pedal 4, 4', at least part of the retention member 5, 5' is arranged facing at least part of the opening 41, 41'.

The fact that it is the pedal 4, 4' which comprises the retaining housing 40, 40' for the retention member 5, 5' and the opening 41, 41' for the rotating shaft 3, 3', offers a more flexible solution for designing the pedal arrangement 1, 1' than when the retaining housing 40, 40' and the opening 41, 41' are arranged in the support 2, 2' of the pedal arrangement 1, 1', because since the support 2, 2' is a part which must be fixed to the structure of the vehicle, it has to meet certain criteria in regard to materials and other limitations in vehicles.

Furthermore, the pedal arrangement 1, 1' of the invention has a simple configuration compared with other pedal assemblies with a safety mechanism for head-on collisions known in the state of the art, comprising a smaller number of parts and the mechanism for at least partially releasing the pedal in the event of a head-on collision being simpler. In the event of a head-on collision, after the activation of the actuating means, the retention member 5, 5' is moved guided by the retaining housing 40, 40' of the pedal 4, 4', without the need to use rotating retaining elements as is common in pedal assemblies of the state of the art.

Figure 12:
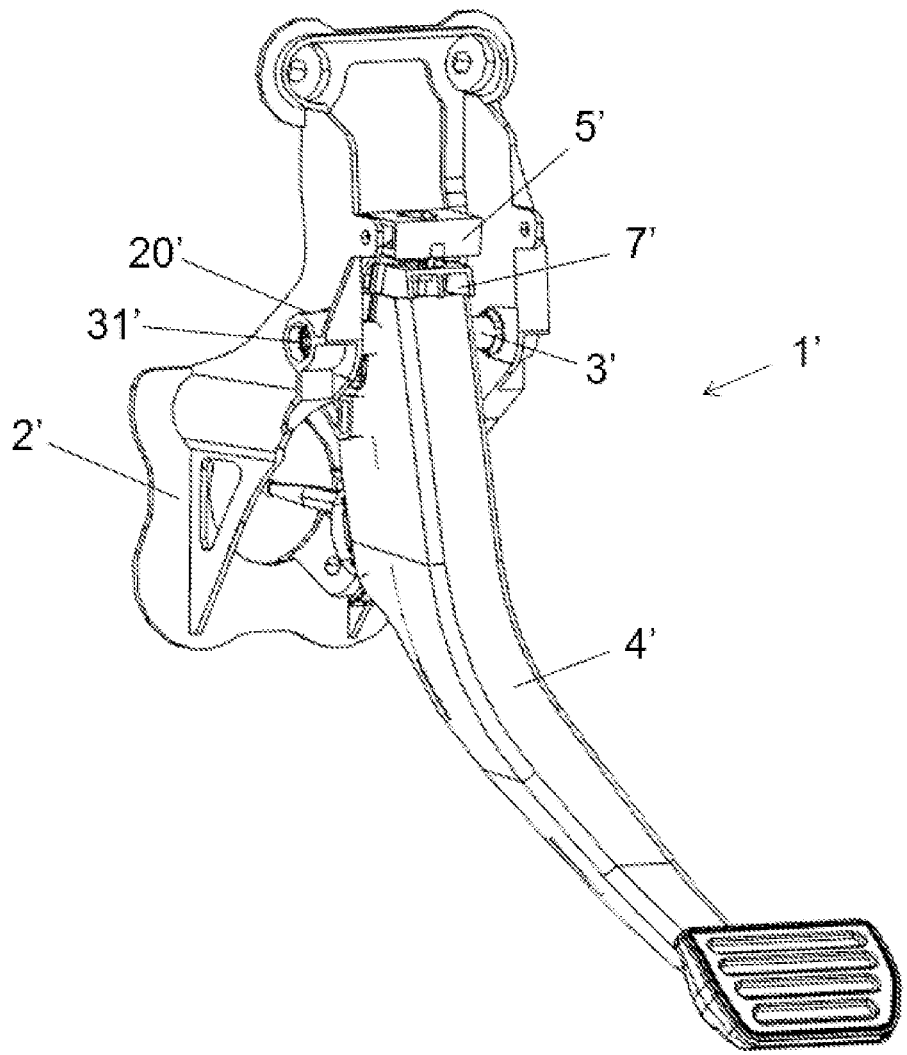
FIG. 12 shows a perspective view of a pedal arrangement according to a second embodiment of the invention, with the pedal arrangement being under normal operating conditions.

As discussed above, under normal operating conditions of the pedal arrangement 1, 1', the retention member 5, 5' is at least partially housed in the retaining housing 40, 40' of the pedal 4, 4', such that the pedal 4, 4' can pivot with respect to the support 2, 2' around the rotating shaft 3, 3', as can be seen for example in FIGS. 1 and 12. That is, under normal operating conditions the retention member 5, 5' fixes the pedal body 4, 4' to the rotating shaft 3, 3', such that the rotating shaft 3, 3', the pedal 4, 4', and the retention member 5, 5' pivot integrally.

Preferably the opening 41, 41' of the pedal 4, 4' has a closed end 410, 410' which is supported against the rotating shaft 3, 3' under normal operating conditions. The end opposite the closed end 410 can be open or closed, i.e., the opening 41, 41' may have a closed contour or an open contour.

Furthermore, preferably the retention member 5, 5' comprises at least one arm 50, 50' which, under normal operating conditions, is arranged fitted in the retaining housing 40, 40' of the pedal 4, 4' and supported against the rotating shaft 3, 3'. Preferably, the at least one arm 50, 50' of the retention member 5, 5' comprises an interference surface 53, 53' which, under normal operating conditions, is arranged supported against the rotating shaft 3, 3'. Therefore, the interference surface 53, 53' of the retention member 5, 5' helps to obtain an interference fit or a press fit between the rotating shaft 3, 3' and the hole forming the interference surface 53, 53' of the retention member 5, 5' and the closed end 410, 410' of the opening 41 of the pedal 4, 4'. Relative movement between the rotating shaft 3, 3', the pedal 4, 4', and the retention member 5, 5' under normal operating conditions of the pedal arrangement 1, 1' is thereby prevented, said parts of the pedal arrangement 1, 1' pivoting integrally under normal operating conditions of the pedal arrangement 1, 1'.

Preferably the actuating means comprise a pyrotechnic actuator 6, 6'. Preferably the pyrotechnic actuator 6, 6' is arranged facing the rotating shaft 3, 3' such that when the pyrotechnic actuator 6, 6' is activated in the event of a head-on collision, the pyrotechnic actuator 6, 6' bounces off the rotating shaft 3, 3' such that the pyrotechnic actuator 6, 6' acts on the retention member 5, 5'. More preferably, the pyrotechnic actuator 6, 6' is arranged facing a substantially planar recessed surface 30, 30' of the rotating shaft 3, 3'.

In other possible embodiments not shown in the figures, the actuating means could be of another type known to one skilled in the art, such as an actuating element fixed to the deformable structure of the vehicle in the event of a head-on collision, the actuating element being arranged such that in the event of a head-on collision it acts on the retention member, at least partially releasing the pedal.

Preferably, as occurs in the first embodiment, shown in FIGS. 1 to 11, the retention member 5 comprises a substantially planar support surface 54 and the rotating shaft 3 comprises a substantially planar recessed surface 30, with the support surface 54 of the retention member 5 being supported on the recessed surface 30 of the rotating shaft 3 under normal operating conditions, this cooperation between the surfaces 30 and 54 contributing in the axial retention of the rotating shaft 3 with respect to the retention member 5 and favoring the integral movement of the rotating shaft 3, the pedal 4, and the retention member 5 under normal operating conditions of the pedal arrangement 1.

Preferably the support 2, 2' comprises a pair of housings 20, 20' configured for receiving a respective end of the rotating shaft 3, 3'. Each end of the rotating shaft 3, 3' is fixed to the corresponding housing 20, 20' by means of a respective bushing 31, 31'. The support 2, 2' is configured for being fixed to the structure of the vehicle. Therefore, under normal operating conditions, the support 2, 2' remains immobile with respect to the structure of the vehicle and the rotating shaft 3, 3' remains rotational with respect to the support 2, 2'.

FIGS. 1 to 11 show the first embodiment of the pedal arrangement 1 for vehicles.

In this first embodiment, the pedal 4, shown in detail in FIG. 7, comprises the pedal body 43 and a retaining plate 44 fixed to the second end 4b of the pedal body 43, the retaining plate 44 comprising part of the retaining housing 40. Preferably the retaining plate 44 is welded to the pedal body 43.

In this first embodiment, the pedal body 43 has a U-shaped cross-section with a front wall 430 and two side walls 431 parallel to one another, each of the side walls 431 extending from a respective longitudinal side of the front wall 430. Furthermore, in this first embodiment the retaining plate 44 comprises a rear wall 440 and two side walls 441 parallel to one another, each side wall 441 extending from a respective longitudinal side of the rear wall 440. The inner face of the rear wall 440 of the retaining plate 44 is arranged facing the inner face of the front wall 430 of the pedal body 43, whereas the side walls 441 of the retaining plate 44 partially surround the side walls 431 of the pedal body 43. Therefore, the retaining plate 44 offers rigidity to the pedal body 43.

In this first embodiment, each of the side walls 431 and 441 of the pedal body 43 and the retaining plate 44 comprises an opening, the openings being arranged facing one another, with all these openings forming the opening 41 of the pedal 4, the rotating shaft 3 being arranged going through the opening 41 of the pedal 4.

Figure 2:
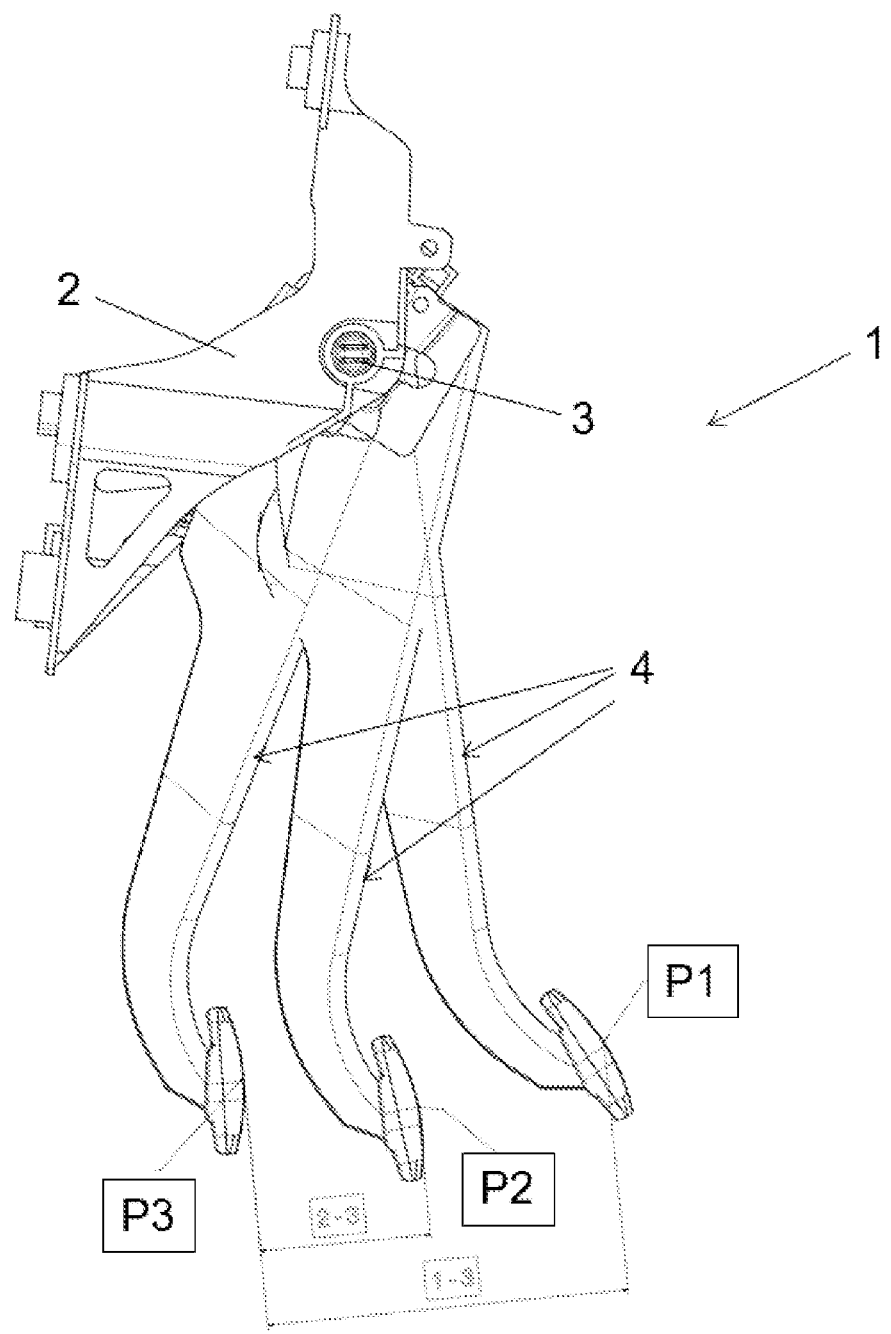
FIG. 2 shows a side view of the limit positions that the pedal can adopt both under normal operating conditions and after a head-on collision.
Figure 3:
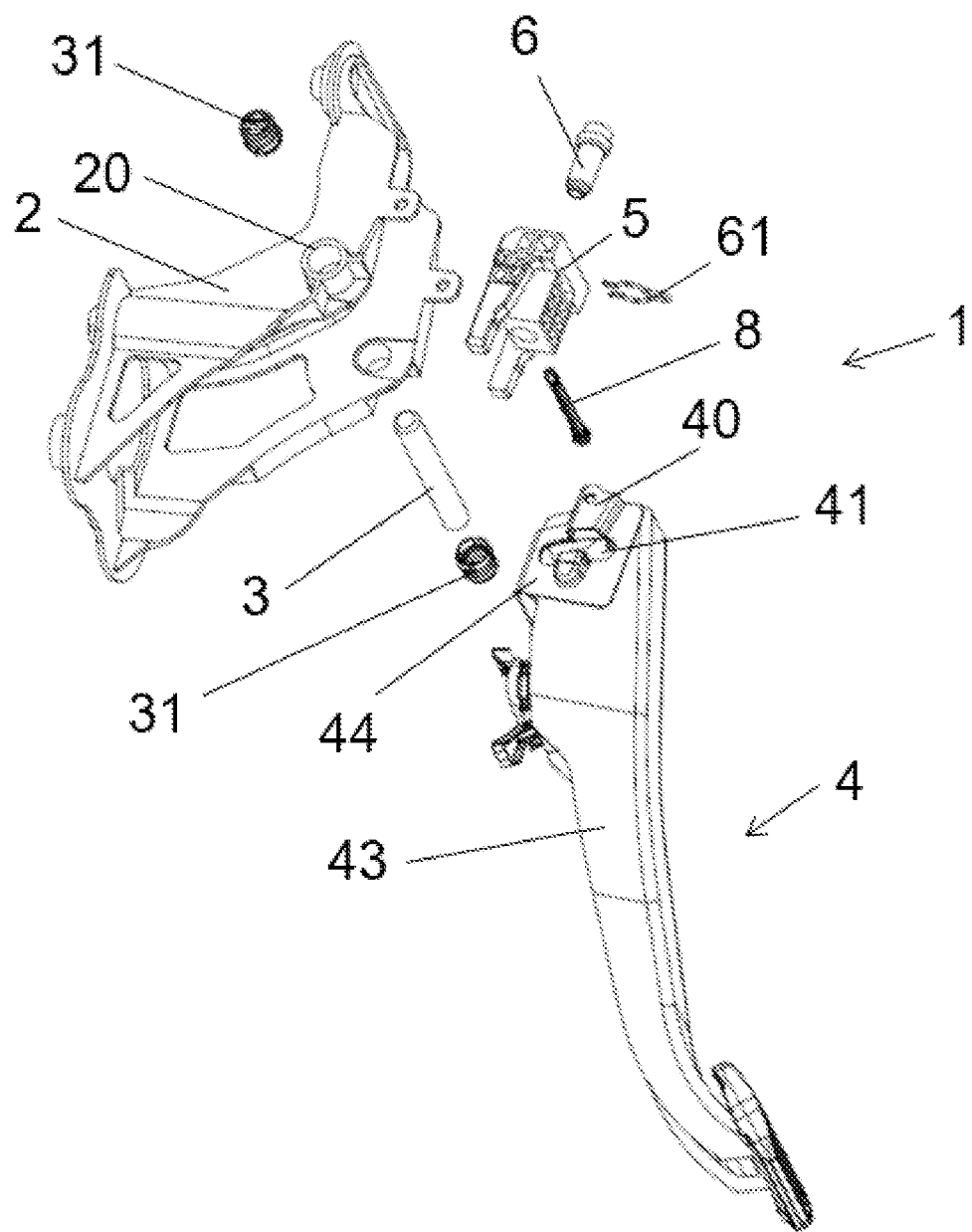
FIG. 3 shows an exploded view of the pedal arrangement of FIG. 1.
Figure 4:
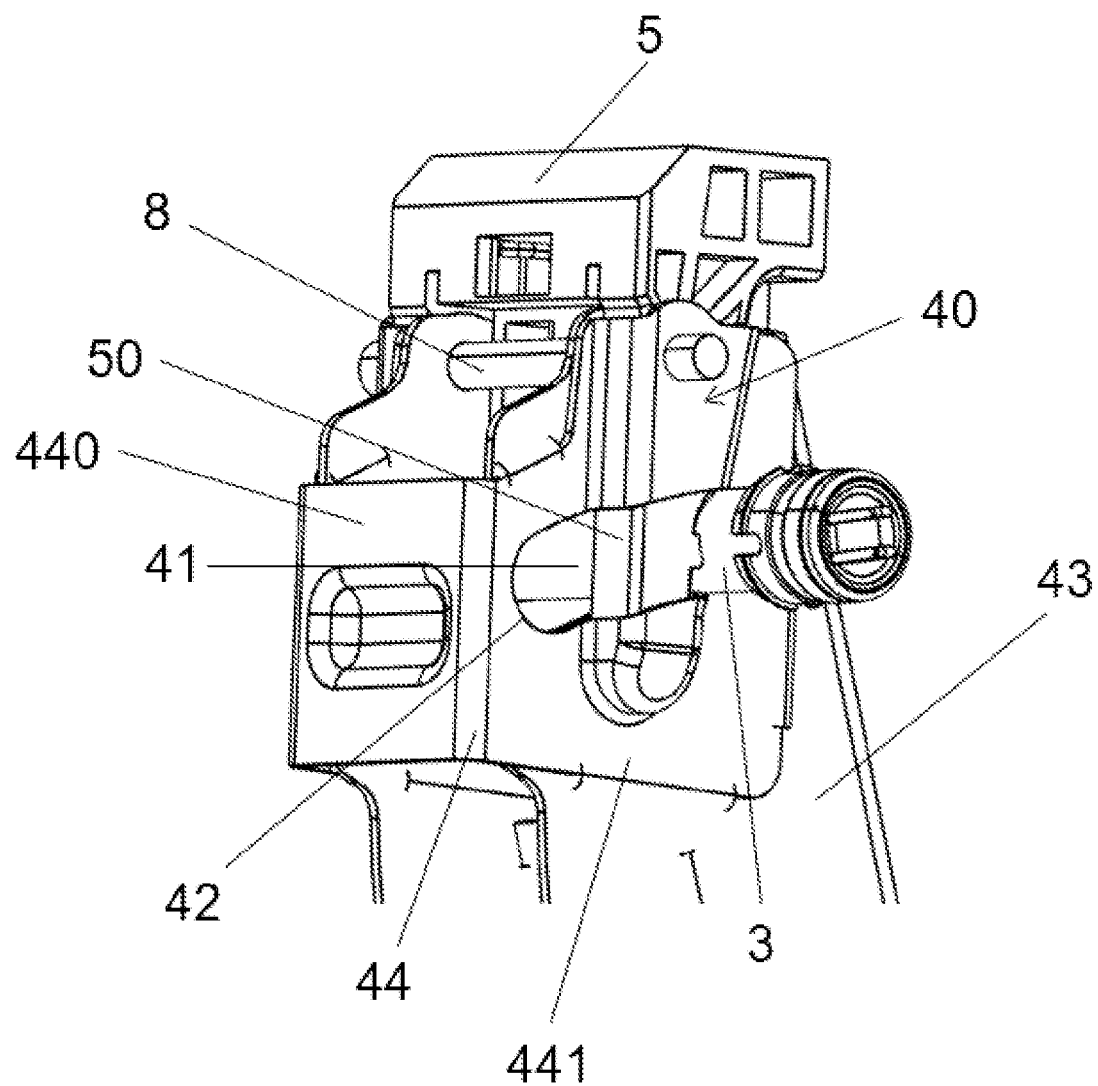
FIG. 4 shows a partial perspective view of the pedal arrangement of FIG. 1, with the pedal arrangement being under normal operating conditions.
Figure 5:
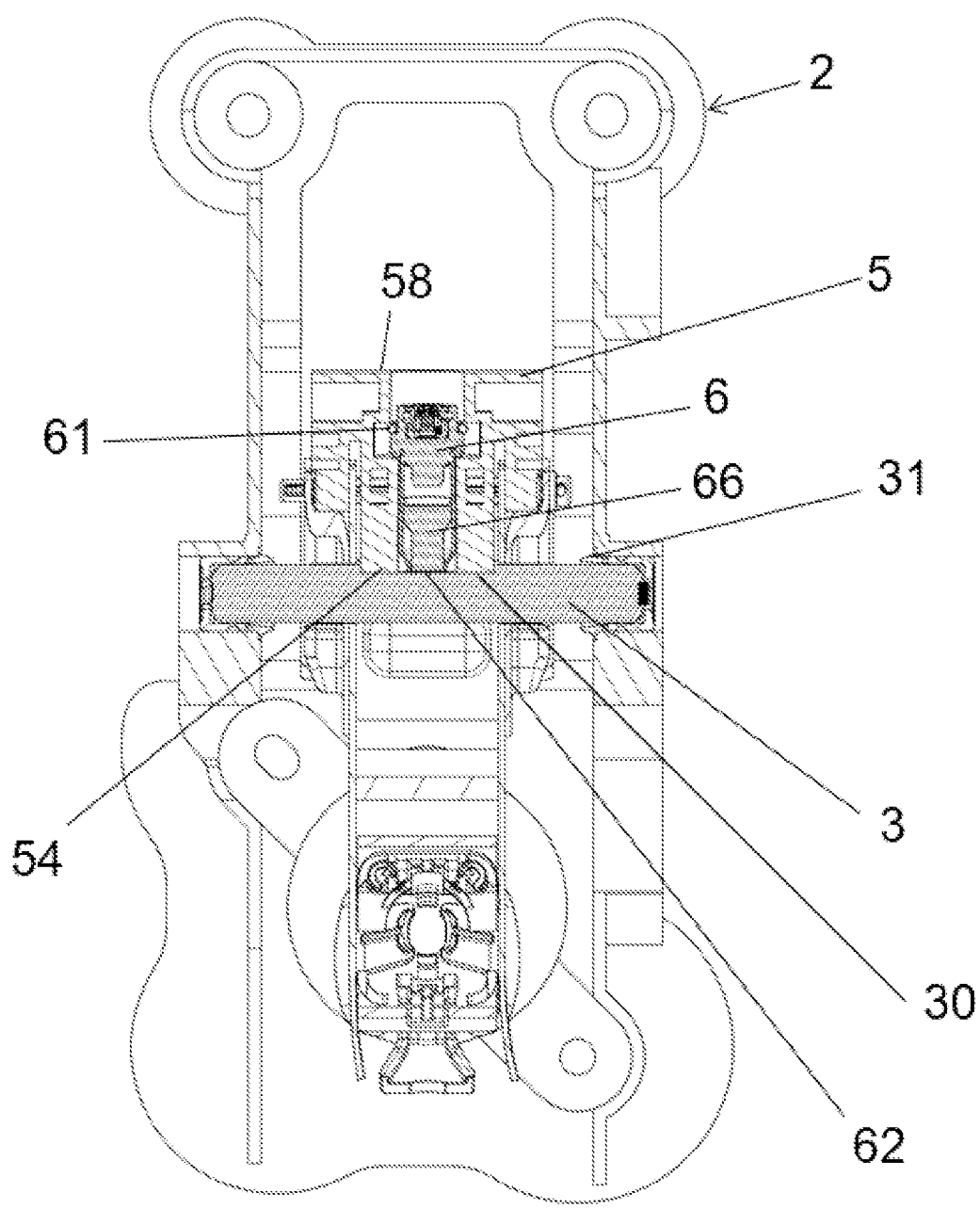
FIG. 5 shows a partial cross-section of the pedal arrangement of FIG. 1, with the pedal arrangement being under normal operating conditions.
Figure 6:
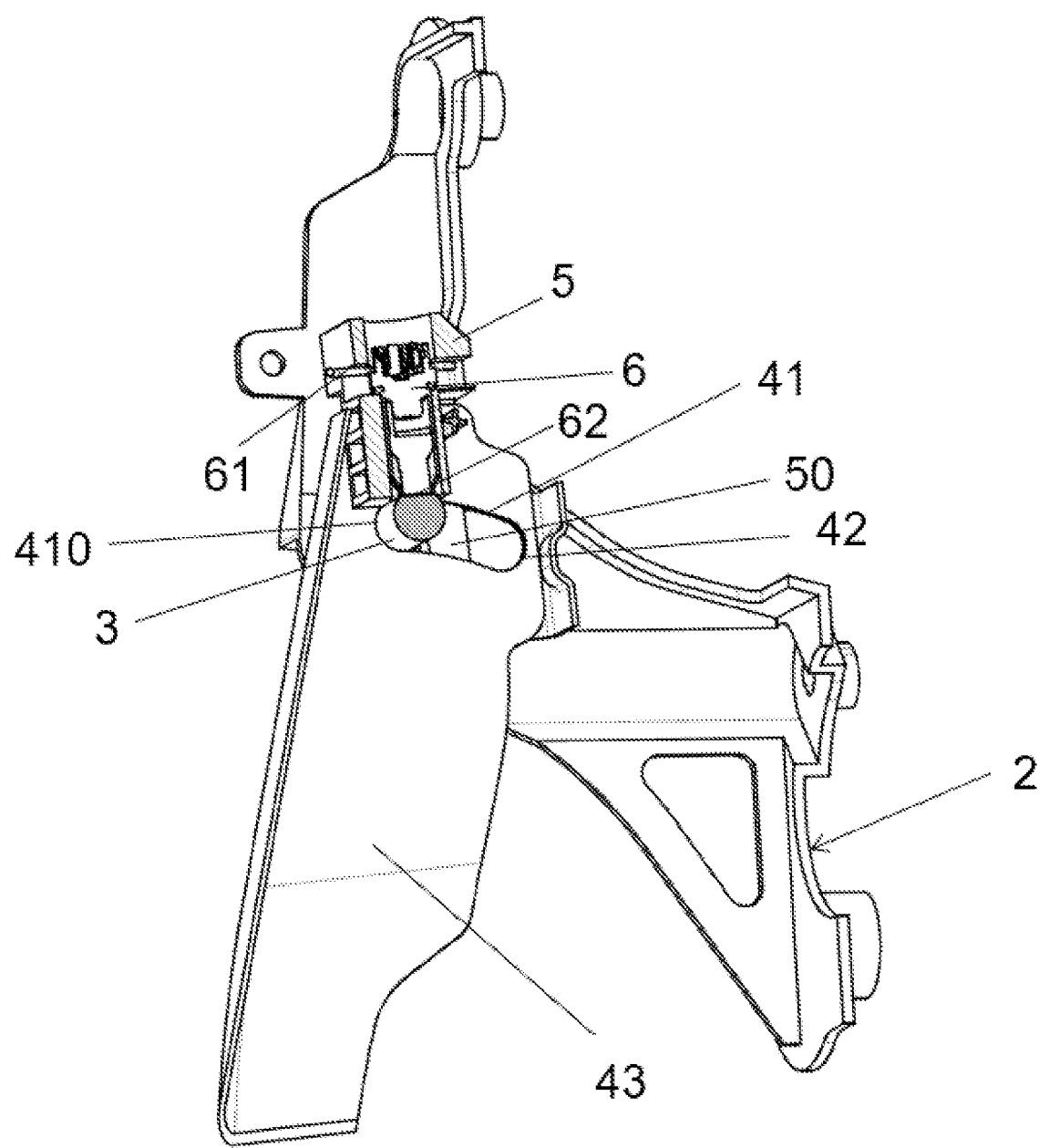
FIG. 6 shows a partial longitudinal section of the pedal arrangement of FIG. 1, with the pedal arrangement being under normal operating conditions.

In this first embodiment, the opening 41 of the pedal 4 has a closed end 410 which is arranged supported against the rotating shaft 3 under normal operating conditions and a stop 42 at the end opposite the closed end 410. Therefore, in this first embodiment the opening 41 of the pedal 4 is an opening 41 with a closed contour, such that in the event of a head-on collision, once the retention member 5 has been moved, the pedal 4 is no longer retained against the rotating shaft 3, i.e., the closed end 410 of the opening 41 is no longer supported against the rotating shaft 3, but the pedal 4 remains movably coupled to the rotating shaft 3 by means of the opening 41. The pedal arrangement 1 thereby partially maintains the capacity for use. Therefore, for example, when the pedal arrangement 1 is used as a brake pedal, the user maintains a limited braking capacity after a head-on crash occurs and the pedal 4 is no longer retained against the rotating shaft 3. FIG. 2 shows the functional travel of the pedal 4 after a head-on collision, where it can pivot with respect to the support 2 between a safety position, identified as P2 in FIG. 2, and the final position, identified as P3 in FIG. 2.

Furthermore, as shown in detail in FIG. 7, in this first embodiment the pedal 4 comprises two retaining housings 40, each retaining housing 40 being configured for housing a respective arm 50 of the retention member 5 when the pedal arrangement 1 is under normal operating conditions. In this first embodiment, each retaining housing 40 comprises a first side and a second side extending perpendicularly from one of the side walls 441 of the corresponding retaining plate 44, a central wall parallel to the side wall 411 connecting the first and second sides, and the part of the side wall 431 of the pedal body 43 which is facing the central wall.

Figure 8:
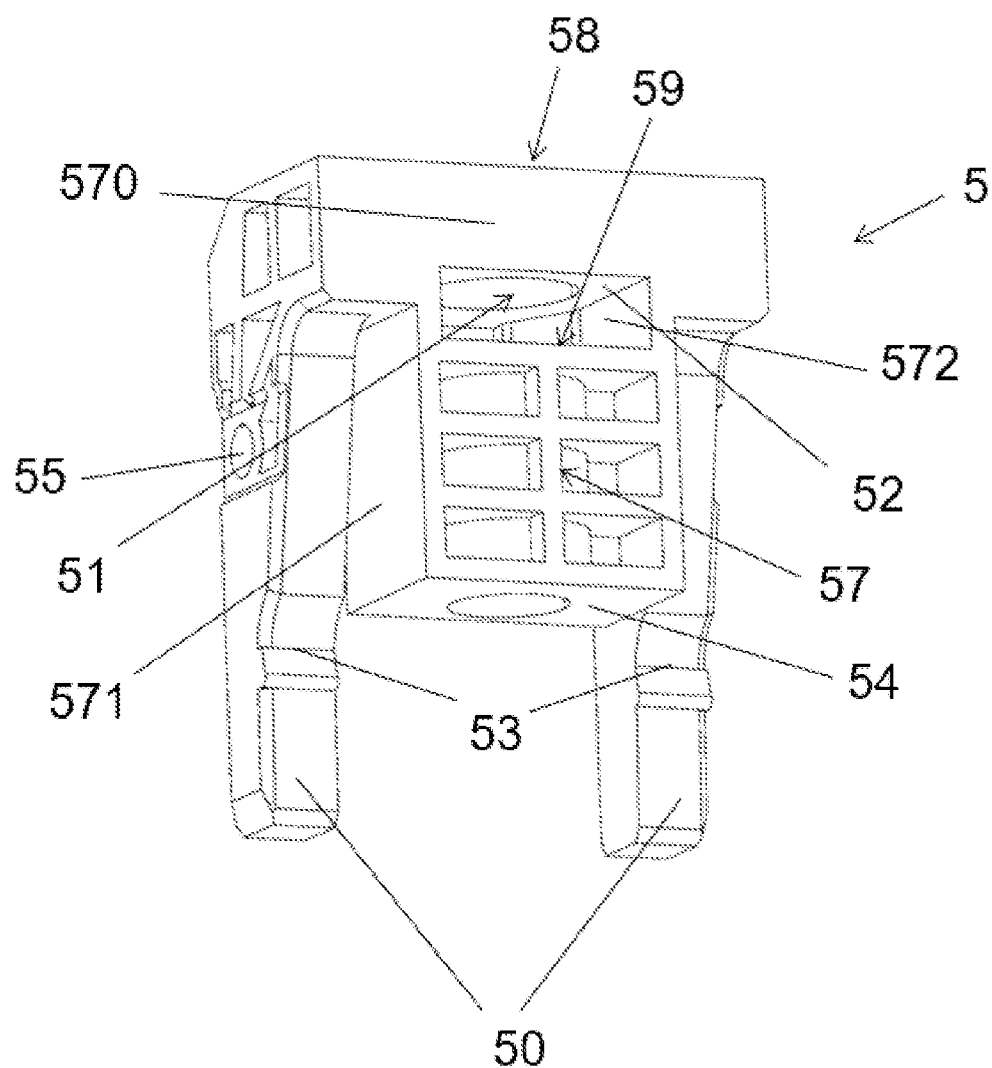
FIG. 8 shows a perspective view of the retention member of the pedal arrangement of FIG. 1.

In this first embodiment, the retention member 5, shown in detail in FIG. 8, comprises two side arms 50 and a central part 57 extending between an upper face 58 and a support surface 54, with the central part 57 being arranged between the arms 50. The arms 50 are configured such that under normal operating conditions, each arm 50 is arranged fitted in a respective retaining housing 40 of the pedal 4, supported against the rotating shaft 3.

In this first embodiment, each arm 50 of the retention member 5 comprises an interference surface 53 which, under normal operating conditions, is arranged supported against the rotating shaft 3. These interference surfaces 53 of the retention member 5 help to obtain an interference fit or press fit between the rotating shaft 3 and the hole forming the interference surface 53 of the retention member 5 and the closed end 410 of the opening 41 of the pedal 4, such that relative movement between the rotating shaft 3, the pedal 4, and the retention member 5 under normal operating conditions of the pedal arrangement 1 is prevented, the parts of the pedal arrangement 1 pivoting integrally under normal operating conditions of the pedal arrangement 1.

In this first embodiment, the central part 57 of the retention member 5 comprises an upper segment 570 extending between the upper face 58 and a pushing surface 52, a lower segment 571 extending between the support surface 54 and a base surface 59, and a hollow segment 572 arranged between the upper segment 570 and the lower segment 571.

Furthermore, in this first embodiment the central part 57 of the retention member 5 comprises a housing 51 extending between the upper face 58 and the support surface 54 going through the central part 57. The housing 51 comprises a first part which is arranged in the upper segment 570 of the central part 57 and a second part which is arranged in the lower segment 571 of the central part 57. The housing 51 is configured for housing the actuating means of the pedal arrangement 1. The first part of the housing 51 has a cylindrical shape with a cross-section with a first diameter, whereas the second part of the housing 51 has a cylindrical shape with a cross-section with a second diameter, the first diameter being greater than the second diameter.

Figure 9:
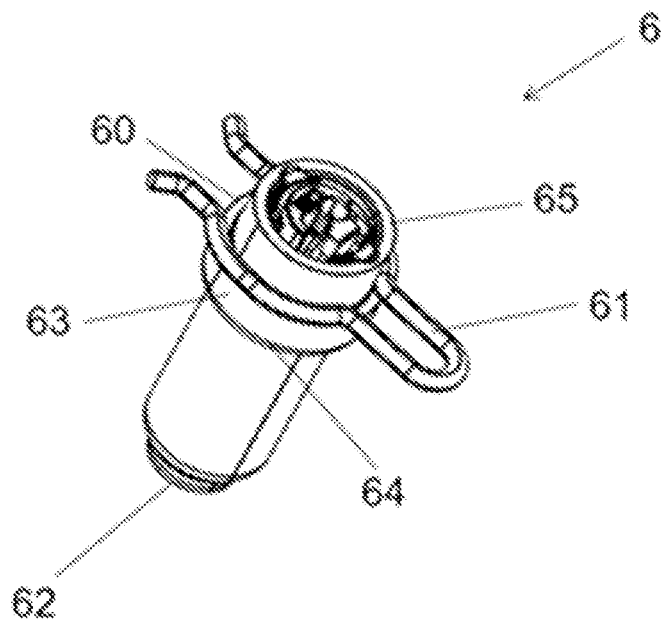
FIG. 9 shows a perspective view of the actuating means of the pedal arrangement of FIG. 1.
Figure 10:
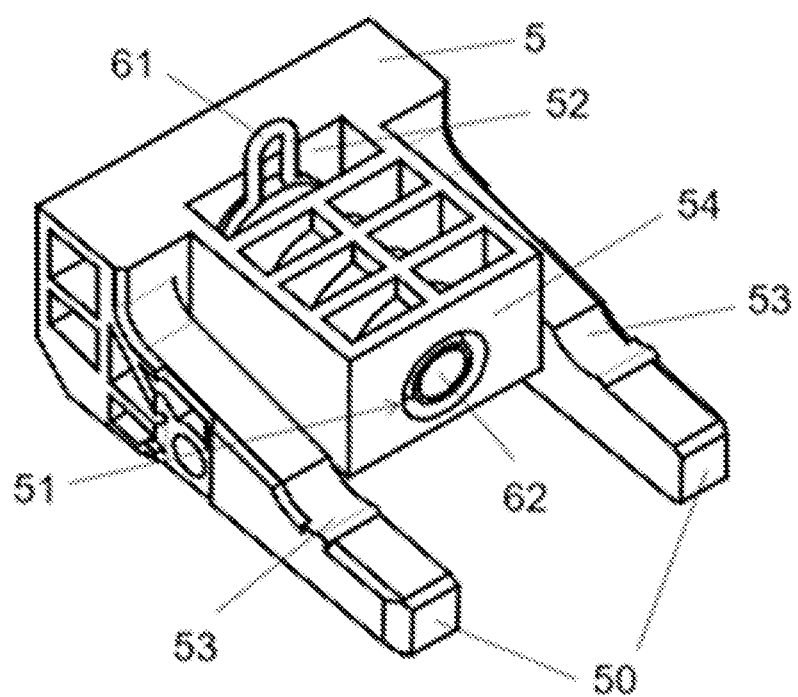
FIG. 10 shows a perspective view of the retention member and the actuating means of the pedal arrangement of FIG. 1.

In this first embodiment, the actuating means comprise a pyrotechnic actuator 6 shown in detail in FIG. 9 which, under normal operating conditions, is arranged housed in the housing 51 of the retention member 5.

In this first embodiment, the pyrotechnic actuator 6 has a substantially cylindrical shape extending between a base 62 and a head 65. Furthermore, the pyrotechnic actuator 6 comprises a perimeter ring 63 radially projecting in the proximity of the head 65. The diameter of the perimeter ring 63 is less than the diameter of the first part of the housing 51, such that the pyrotechnic actuator 6 can be introduced in the housing 51 through the upper face 58 of the retention member 5, but the diameter of the perimeter ring 63 is greater than the diameter of the second part of the housing 51, such that once the pyrotechnic actuator 6 has been introduced from the upper face 58, the perimeter ring 63 of the pyrotechnic actuator 6 abuts against the base surface 59 of the lower segment 571, with the perimeter ring 63 of the pyrotechnic actuator 6 being arranged in the hollow segment 572 of the central part 57 of the retention member 5 supported on the base surface 59. In other possible embodiments, the pyrotechnic actuator can be a bushing having another shape. In that case, the housing of the retention member will be adapted to cooperate with the shape of the bushing.

In this first embodiment, the actuating means also comprise a securing ring 61 coupled to the pyrotechnic actuator 6 and retaining the pyrotechnic actuator 6 inside the housing 51 of the retention member 5, since the securing ring 61 abuts against the pushing surface 52 of the retention member 5. The securing ring 61 is arranged on an actuating surface 60 of the perimeter ring 63 of the pyrotechnic actuator 6, with the securing ring 61 being fitted between the actuating surface 60 of the pyrotechnic actuator 6 and the pushing surface 52 of the retention member, such that when the pyrotechnic actuator 6 is activated in the event of a head-on collision, the actuating surface 60 acts through the securing ring 61 on the pushing surface 52 by moving the retention member 5. Therefore, in addition to retaining the pyrotechnic actuator 6 inside the housing 51 of the retention member 5, the securing ring 61 improves the distribution of force when the pyrotechnic actuator 6 is activated after a head-on collision, since the transmission of force extends across the entire surface of the securing ring 61 which is in contact with the pushing surface 52 of the retention member 5.

In this first embodiment, the pyrotechnic actuator 6 is arranged facing the rotating shaft 3 such that when the pyrotechnic actuator 6 is activated in the event of a head-on collision, the pyrotechnic actuator 6 bounces off the rotating shaft 3, with the actuating surface 60 of the pyrotechnic actuator 6 acting on the pushing surface 52 of the retention member 5, moving it. Namely, it is the base 62 of the pyrotechnic actuator 6 which is arranged facing the rotating shaft 3, as shown in detail in FIGS. 5 and 6. The pyrotechnic actuator 6 comprises a piston 66 which is triggered in the event of activation of the pyrotechnic actuator 6, projecting with respect to the base 62 of the pyrotechnic actuator 6. In this case, it is the piston 66 that bounces off the shaft 3 in the event of activation of the pyrotechnic actuator 6. When the piston 66 crashes against the rotating shaft 3, the triggering energy is transferred through the securing ring 61 to the retention member 5, making the arms 50 of the retention member 5 become dislodged from the retaining housing 40 of the pedal 4. The operation of the pyrotechnic actuator 6 is well known to one skilled in the art.

Figure 11:
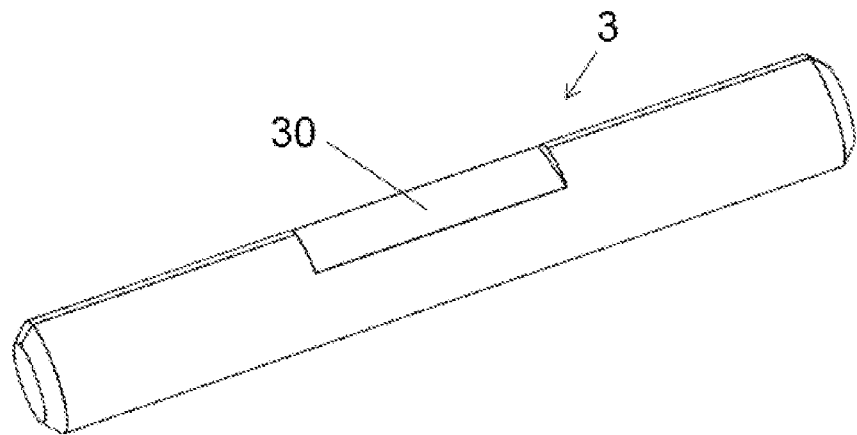
FIG. 11 shows a perspective view of the rotating shaft of the pedal arrangement of FIG. 1.

In this first embodiment, the rotating shaft 3, shown in detail in FIG. 11, comprises a substantially planar recessed surface 30. As shown in detail in FIG. 5, under normal operating conditions the support surface 54 of the retention member 5 is arranged supported in the recessed surface 30 of the rotating shaft 3, with this cooperation between the surfaces 30 and 54 contributing to the axial retention of the rotating shaft 3 with respect to the retention member 5, and favoring the integral movement of the rotating shaft 3, the pedal 4, and the retention member 5 under normal operating conditions of the pedal arrangement 1.

Furthermore, the base 62 of the pyrotechnic actuator 6 is also arranged facing the recessed surface 30 of the rotating shaft 3. The fact that this recessed surface 30 is substantially planar favors, in the case of activation of the pyrotechnic actuator 6, the bouncing off of the pyrotechnic actuator 6 on the rotating shaft 3 covering a larger surface area than in the event of the rotating shaft 3 being completely cylindrical, favoring a better transmission of forces in the event of a head-on collision.

In this first embodiment, the pedal arrangement 1 comprises a coupling part 8 transversely going through the pedal 4 and the retention member 5 through respective holes 46 and 55. Therefore, in addition to the interference fit between the pedal 4 and the retention member 5, the pedal 4 and the retention member 5 are also coupled by means of the coupling part 8 which provides a dual coupling security. The coupling part 8 is configured such that in the event of a head-on collision, the force the pyrotechnic actuator 6 exerts on the retention member 5 breaks the coupling part 8, where the retention member 5 may effortlessly be dislodged from the retaining housing 40 of the pedal 4.

FIGS. 12 to 18 show a second embodiment of the pedal arrangement 1'.

Figure 14:
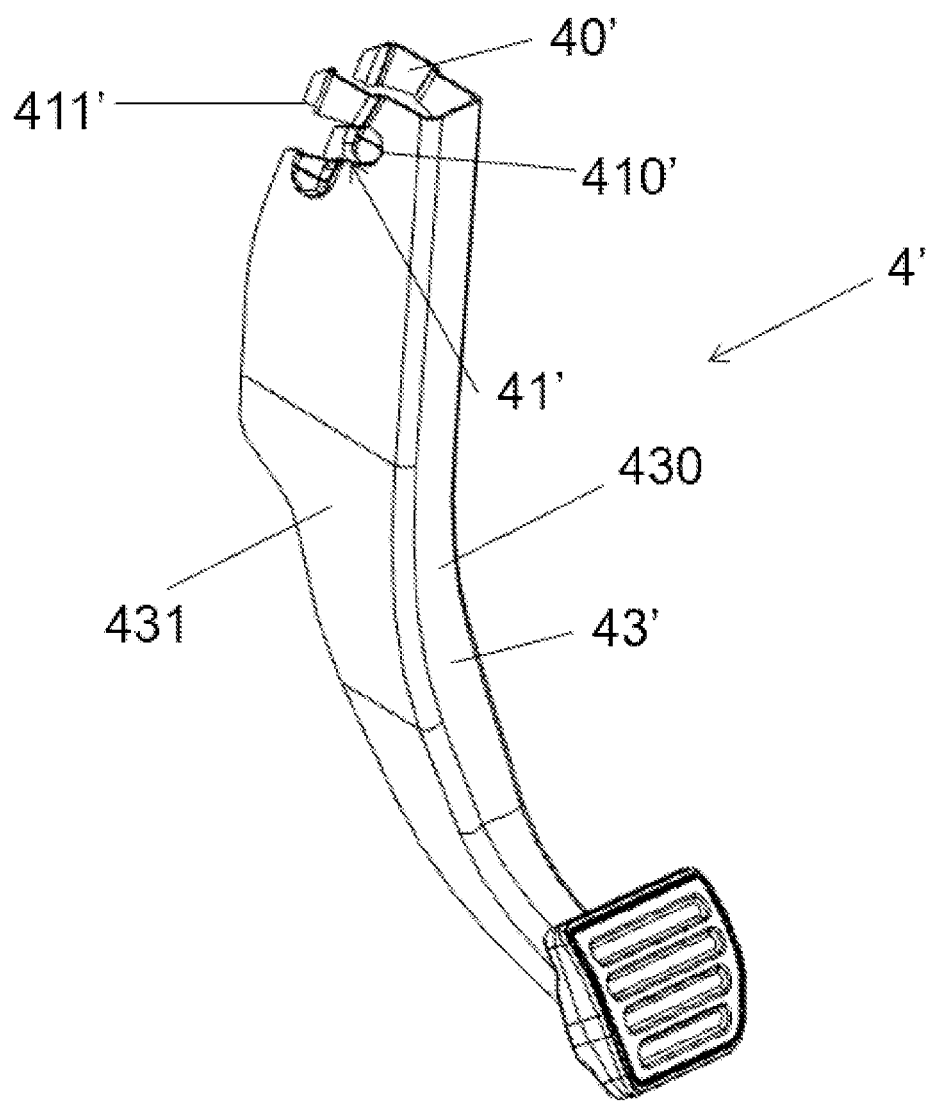
FIG. 14 shows a perspective view of the pedal of the pedal arrangement of FIG. 12.

In this second embodiment, the pedal body 43', shown in detail in FIG. 14, has a U-shaped cross-section with a front wall 430' and two side walls 431' parallel to one another, each of the side walls 431' extending from a respective longitudinal side of the front wall 430'.

In this second embodiment, each of the side walls 431' of the pedal body 43' comprises an opening, the openings being arranged facing one another, with the openings forming the opening 41' of the pedal 4', the rotating shaft 3' being arranged going through the opening 41' of the pedal 4' under normal operating conditions of the pedal arrangement 1'.

In this second embodiment, the opening 41' of the pedal 4' has a closed end 410' which is arranged supported against the rotating shaft 3' under normal operating conditions, and an open end 411' at the end opposite the closed end 410'. Therefore, in this second embodiment, the opening 41' of the pedal 4' is an opening 41' with an open contour, such that in the event of a head-on collision, once the retention member 5' has been moved, the pedal 4' is no longer retained against the rotating shaft 3', and as a consequence of the weight of the pedal 4', the pedal 4' is decoupled from the rotating shaft 3' through the open end 411' of the opening 41'.

As shown in detail in FIG. 14, in this second embodiment each side wall 431' of the pedal body 43' comprises a respective retaining housing 40' configured for housing a respective arm 50' of the retention member 5' when the pedal arrangement 1' is under normal operating conditions. In this second embodiment, each retaining housing 40' comprises a first side and a second side extending perpendicularly from the corresponding side wall 431' and a central wall parallel to the side wall 431' connecting the first and second sides.

Figure 15:
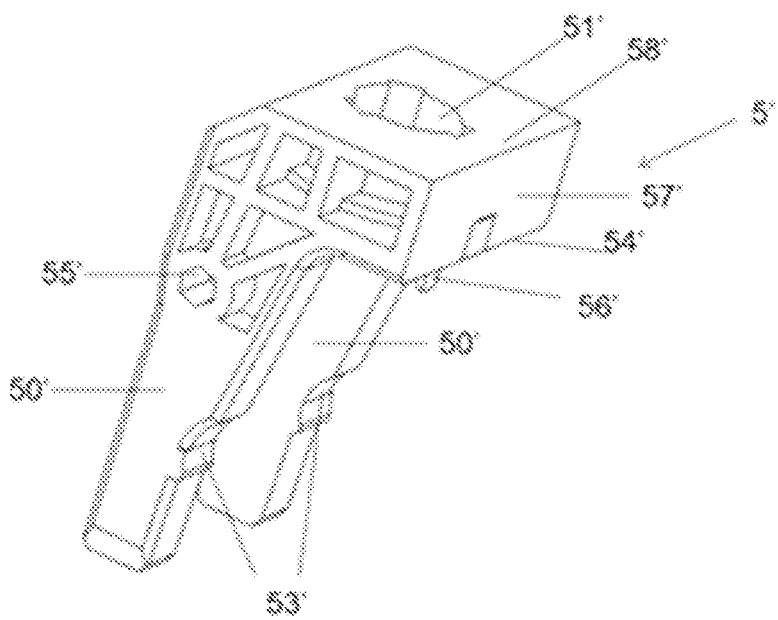
FIG. 15 shows a perspective view of the retention member of the pedal arrangement of FIG. 12.

In this second embodiment, the retention member 5', shown in detail in FIG. 15, comprises two side arms 50' and a central part 57' extending between an upper face 58' and a lower face 54', with the central part 57' being arranged between the arms 50'. The arms 50' are configured such that under normal operating conditions, each arm 50' is arranged fitted in a respective retaining housing 40' of the pedal 4', supported against the rotating shaft 3'.

In this second embodiment, each arm 50' of the retention member 5' comprises an interference surface 53' which, under normal operating conditions, is arranged supported against the rotating shaft 3'. These interference surfaces 53' of the retention member 5' help to obtain an interference fit or press fit between the rotating shaft 3' and the hole forming the interference surface 53' of the retention member 5' and the closed end 410' of the opening 41' of the pedal 4', such that relative movement between the rotating shaft 3', the pedal 4', and the retention member 5' under normal operating conditions of the pedal arrangement 1' is prevented, with said parts of the pedal arrangement 1' pivoting integrally under normal operating conditions of the pedal arrangement 1'.

Furthermore, in this second embodiment, the central part 57' of the retention member 5' comprises a housing 51' extending between the upper face 58' and the lower face 54', the central part 57' going through the housing 51'. The housing 51' is configured for housing the actuating means of the pedal arrangement 1'. The retention member 5' comprises a plurality of clips 56' extending perpendicularly from the lower face 54' of the central part 57' and arranged close to the housing 51', the clips 56' being configured for retaining the actuating means.

Figure 18:
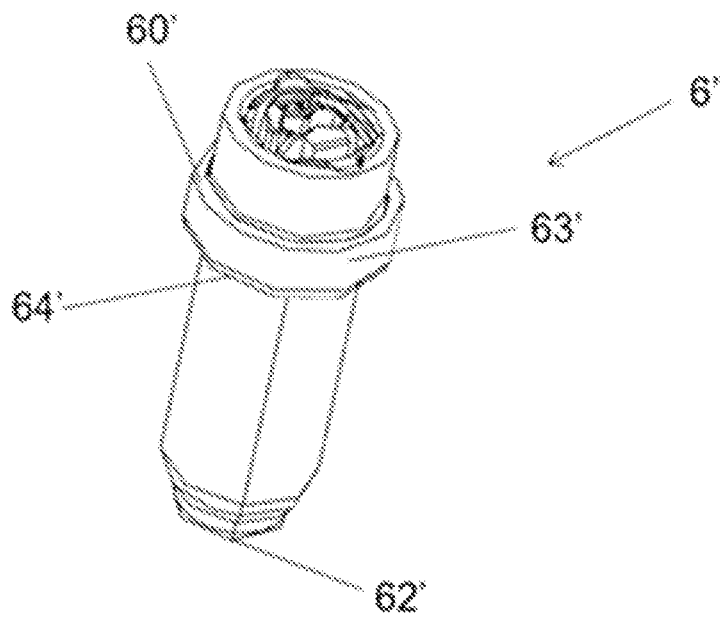
FIG. 18 shows a perspective view of the actuating means of the pedal arrangement of FIG. 12.

In this second embodiment, the actuating means comprises a pyrotechnic actuator 6', shown in detail in FIG. 18, which, under normal operating conditions, is arranged housed in the housing 51' of the retention member 5'.

In this second embodiment, the pyrotechnic actuator 6' is a bushing extending between a base 62' and a head 65'. Furthermore, the pyrotechnic actuator 6' comprises a perimeter ring 63' radially projecting in the proximity of the head 65', the perimeter ring 63' comprising an actuating surface 60' radially extending from the body of the bushing and a gripping surface 64' radially extending from the body of the bushing. The pyrotechnic actuator 6' is coupled to the retention member 5' such that the clips 56' of the retention member 5' retain the pyrotechnic actuator 6' through the gripping surface 64', and the actuating surface 60' abuts against a pushing surface of the retention member 5'. If the pyrotechnic actuator 6' is activated in the event of a head-on collision, the actuating surface 60' of the pyrotechnic actuator 6' acts on the pushing surface of the retention member 5', moving it.

Figure 16:
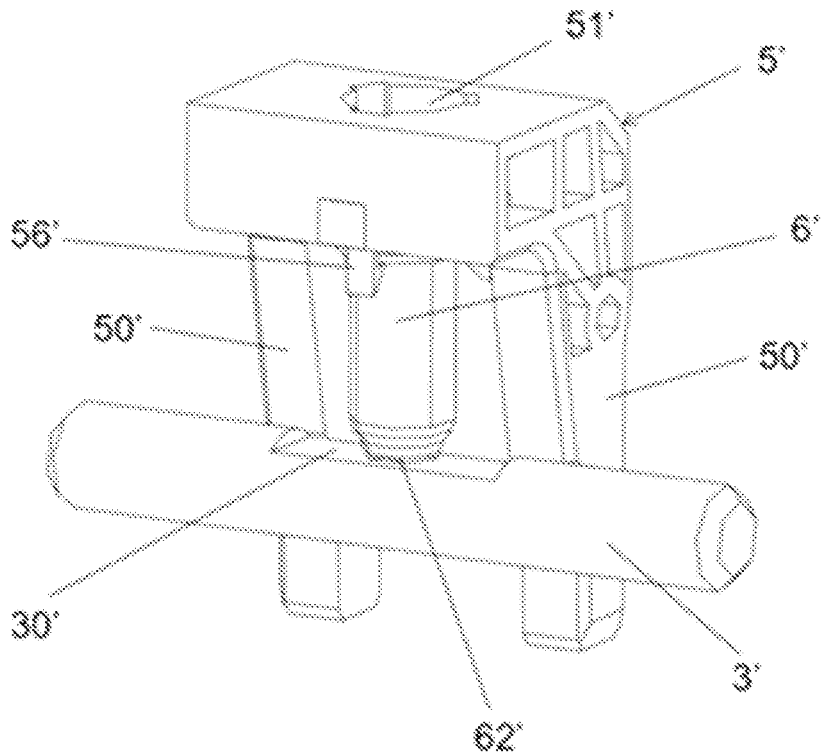
FIG. 16 shows a perspective view of the retention member, the rotating shaft, and the actuating means of the pedal arrangement of FIG. 12.
Figure 17:
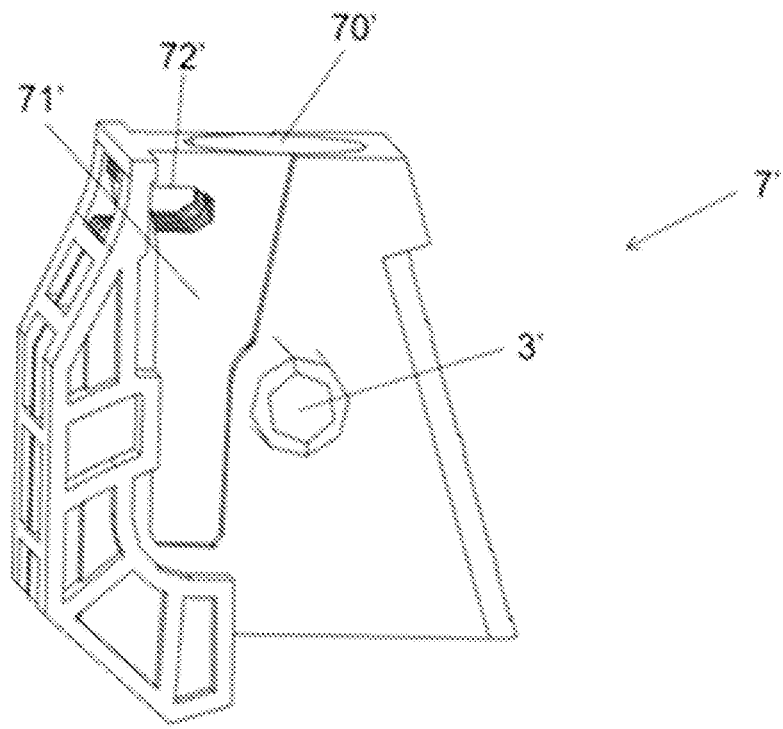
FIG. 17 shows a perspective view of the additional part and the rotating shaft of the pedal arrangement of FIG. 12.

In this second embodiment, the pyrotechnic actuator 6' is arranged facing the rotating shaft 3' as shown in detail in FIG. 16, such that when the pyrotechnic actuator 6' is activated in the event of a head-on collision, the pyrotechnic actuator 6' bounces off the rotating shaft 3', with the actuating surface 60' of the pyrotechnic actuator 6' acting on the pushing surface of the retention member 5', moving the retention member 5'. Namely, it is the base 62' of the pyrotechnic actuator 6' which is arranged facing the rotating shaft 3'. The pyrotechnic actuator 6' comprises a piston which is triggered in the event of activation of the pyrotechnic actuator 6', projecting with respect to the base 62' of the pyrotechnic actuator 6'. In this case, it is the piston that bounces off the shaft 3' in the event of activation of the pyrotechnic actuator 6'. When the piston crashes against the rotating shaft 3', the triggering energy is transferred through the actuating surface 60' to the retention member 5', making the arms 50' of the retention member 5' become dislodged from the retaining housing 40' of the pedal 4'. The operation of the pyrotechnic actuator 6' is well known to one skilled in the art.

In this second embodiment, the rotating shaft 3' comprises a substantially planar recessed surface 30'. The base 62' of the pyrotechnic actuator 6' is arranged facing the recessed surface 30'. The fact that this recessed surface 30' is substantially planar favors, in the case of activation of the pyrotechnic actuator 6', the bouncing of the pyrotechnic actuator 6' on the rotating shaft 3' covering a larger surface area than in the event of the rotating shaft 3' being completely cylindrical, favoring a better transmission of forces in the event of a head-on collision.

In this second embodiment, the pedal arrangement 1' comprises an additional part 7' integral with the rotating shaft 3'. The additional part 7' comprises a central body and two housings 71', with these housings 71' being arranged on the side faces of the central body. Under normal operating conditions of the pedal arrangement 1', the housings 71' of the additional part 7' are arranged facing the retaining housing 40' of the pedal 4', with the retention member 5' being partially housed in the cavity formed by the retaining housing 40' of the pedal 4' and the housing 71' of the additional part 7' and the cavity guiding the movement of the retention member 5' when the actuating means are activated after a head-on collision.

In this second embodiment, the rotating shaft 3' transversely goes through the additional part 7'. Preferably the additional part 7' is overmolded onto the rotating shaft 3'.

In this second embodiment, the additional part 7' also comprises a central hole 70 which the pyrotechnic actuator 6' goes through.

In this second embodiment, the pedal arrangement 1' comprises a coupling part 8' transversely going through the additional part 7' and the retention member 5' through respective holes 72' and 55'. Therefore, in addition to the interference fit between the pedal 4' and the retention member 5', the additional part 7' and the retention member 5' are also coupled by means of the coupling part 8' which provides dual coupling security. The coupling part 8' is configured such that in the event of a head-on collision, the force the pyrotechnic actuator 6' exerts on the retention member 5' breaks the coupling part 8', where the retention member 5' may effortlessly be dislodged from the retaining housing 40' of the pedal 4'.

The invention also relates to a motor vehicle comprising at least one pedal arrangement 1, 1' such as those disclosed above.

Various aspects of the present disclosure are set out in the following numbered clauses.

Clause 1. Vehicle pedal arrangement, comprising
a support (2, 2') configured for being fixed to a vehicle,
a rotating shaft (3, 3') coupled to the support (2, 2'),
a pedal (4, 4') comprising a first end (4a, 4a') and a second end (4b, 4b'), the first end (4a, 4a') comprising a shoe (45, 45'),
a retention member (5, 5') which, under normal operating conditions, retains the pedal (4, 4') in the support (2, 2') such that it can pivot with respect to the support (2, 2') on said rotating shaft (3, 3'), and
actuating means which, in the event of a head-on collision, move the retention member (5, 5'), at least partially releasing the pedal (4, 4') from the support (2, 2'),
under normal operating conditions the retention member (5, 5') retains the pedal (4, 4') against the rotating shaft (3, 3'), such that when the actuating means move said retention member (5, 5') the pedal (4, 4') is no longer retained against the rotating shaft (3, 3'), and
the pedal (4, 4') comprises at the second end (4b, 4b') a retaining housing (40, 40') and an opening (41, 41'), such that under normal operating conditions the rotating shaft (3, 3') is arranged in said opening (41, 41') and the retention member (5, 5') is at least partially housed in said retaining housing (40, 40') supported against the rotating shaft (3, 3'), retaining said rotating shaft (3, 3') in said opening (41, 41').

Clause 2. Pedal arrangement according to clause 1, wherein the opening (41, 41') of the pedal (4, 4') has a closed end (410, 410') which is supported against the rotating shaft (3, 3') under normal operating conditions, the rotating shaft (3, 3') being retained between said closed end (410, 410') and the retention member (5, 5').

Clause 3. Pedal arrangement according to clause 1 or 2, wherein the retention member (5, 5') comprises at least one arm (50, 50') which, under normal operating conditions, is arranged fitted in the retaining housing (40, 40') of the pedal (4, 4') and supported against the rotating shaft (3, 3').

Clause 4. Pedal arrangement according to any of clauses 1 to 3, wherein the arm (50, 50') of the retention member (5, 5') comprises an interference surface (53, 53') which, under normal operating conditions, is arranged supported against the rotating shaft (3, 3').

Clause 5. Pedal arrangement according to any of clauses 1 to 4, wherein the actuating means comprise a pyrotechnic actuator (6, 6') configured for being activated in the event of a head-on collision.

Clause 6. Pedal arrangement according to clause 5, wherein under normal operating conditions, the pyrotechnic actuator (6, 6') is arranged in a housing (51, 51') of the retention member (5, 5'), the retention member (5, 5') comprising a pushing surface (52, 52') which is arranged facing an actuating surface (60, 60') of the pyrotechnic actuator (6, 6'), such that when the pyrotechnic actuator (6, 6') is activated, the actuating surface (60, 60') cooperates with the pushing surface (52, 52') by moving the retention member (5, 5').

Clause 7. Pedal arrangement according to clause 5 or 6, wherein the pyrotechnic actuator (6, 6') is arranged facing the rotating shaft (3, 3') such that when activated it bounces off the rotating shaft (3, 3').

Clause 8. Pedal arrangement according to any of clauses 1 to 7, wherein the rotating shaft (3) comprises a substantially planar recessed surface (30), and the retention member (5) comprises a substantially planar support surface (54), the support surface (54) of the retention member (5) being supported on the recessed surface (30) of the rotating shaft (3) under normal operating conditions.

Clause 9. Pedal arrangement according to any of clauses 1 to 8, wherein the opening (41) of the pedal (4) comprises a stop (42) at an end opposite the closed end (410) such that the pedal (4) is coupled to the support (2) when the retention member (5) is moved after a head-on collision, such that the capacity for use of the pedal arrangement (1) after a head-on collision is partially maintained.

Clause 10. Pedal arrangement according to any of clauses 1 to 8, wherein the opening (41') of the pedal (4)' comprises an open end (411') opposite the closed end (410'), such that the pedal (4') is decoupled from the rotating shaft (3') after a head-on collision.

Clause 11. Pedal arrangement according to any of clauses 1 to 10, wherein the pedal comprises a retaining plate (44) fixed to the pedal body (43), said retaining plate (44) comprising at least part of the retaining housing (40), the retaining plate (44) preferably being welded to the pedal body (43).

Clause 12. Pedal arrangement according to any of clauses 1 to 10, comprising an additional part (7') integral with the rotating shaft (3') and comprising a housing (71') which, under normal operating conditions, is arranged facing the retaining housing (40') of the pedal (4'), the retention member (5') being at least partially housed in the cavity formed by the retaining housing (40') of the pedal (4') and the housing (71') of the additional part (7') and said cavity guiding the movement of the retention member (5') when the actuating means are activated after a head-on collision.

Clause 13. Motor vehicle comprising at least one pedal arrangement (1, 1') according to any of the preceding clauses.

What is claimed is:

1. A pedal assembly for a vehicle, the pedal assembly comprising:
   a support configured to be attached to the vehicle;
   a rotating shaft coupled to the support;
   a pedal having a first end and a second end, the second end including a retaining housing and an opening, under normal operating conditions the rotating shaft being arranged in the opening;
   a retention member that, under normal operating conditions, retains a portion of the pedal against the rotating shaft so that the pedal can pivot with respect to the support on the rotating shaft, a portion of the retention member being at least partially housed in the retaining housing supported against the rotating shaft to retain the rotating shaft in the opening of the pedal; and
   an actuator that, in the event of a head-on collision, is configured to act on the retention member to move the retention member so that the portion of the pedal is no longer retained against the rotating shaft, the pedal being at least partially released from the support.

2. The pedal assembly according to claim 1, wherein the opening of the pedal has a closed end which is supported against the rotating shaft under normal operating conditions, the rotating shaft being retained between the closed end and the retention member.

3. The pedal assembly according to claim 2, wherein the opening of the pedal includes a stop at an end opposite the closed end such that the rotating shaft remains partially coupled to the support after the retention member is moved after the head-on collision so that the use of the pedal assembly is partially maintained after the head-on collision.

4. The pedal assembly according to claim 2, wherein the opening of the pedal includes an open end opposite the closed end, such that the pedal is decoupled from the rotating shaft after the head-on collision.

5. The pedal assembly according to claim 1, wherein the portion of the retention member comprises at least one arm having an interference surface that, under normal operating conditions, is arranged supported against the rotating shaft.

6. The pedal assembly according to claim 1, wherein the actuator comprises a pyrotechnic actuator that is configured to activate in the event of the head-on collision.

7. The pedal assembly according to claim 6, wherein, under normal operating conditions, the pyrotechnic actuator is arranged in a housing of the retention member.

8. The pedal assembly according to claim 7, wherein the retention member includes a pushing surface that is arranged facing an actuating surface of the pyrotechnic actuator, such that when the pyrotechnic actuator activates, the actuating surface cooperates with the pushing surface to cause the retention member to move.

9. The pedal assembly according to claim 8, wherein the pyrotechnic actuator is arranged facing the rotating shaft and when activated is configured to bounce off the rotating shaft.

10. The pedal assembly according to claim 7, wherein the pyrotechnic actuator is arranged facing the rotating shaft and when activated is configured to bounce off the rotating shaft.

11. The pedal assembly according to claim 6, wherein the pyrotechnic actuator is arranged facing the rotating shaft and when activated is configured to bounce off the rotating shaft.

12. The pedal assembly according claim 1, wherein the rotating shaft includes a substantially planar recessed surface, and the retention member includes a substantially planar support surface, the substantially planar support surface of the retention member being supported on the substantially planar recessed surface of the rotating shaft under normal operating conditions.

13. The pedal assembly according to claim 12, wherein the actuator comprises a pyrotechnic actuator that is configured to activate in the event of the head-on collision, the pyrotechnic actuator being arranged facing the rotating shaft and when activated is configured to bounce off the substantially planar recessed surface of the rotating shaft.

14. The pedal assembly according to claim 1, further comprising a coupling part that passes through a hole in the pedal and a hole in the retention member.

15. The pedal assembly according to claim 14, wherein the actuator comprises a pyrotechnic actuator arranged in a housing of the retention member, the pyrotechnic actuator being configured to activate in the event of the head-on collision, the pyrotechnic actuator and retention member being configured such that when the pyrotechnic actuator activates it causes the retention member to move, the coupling part being configured to break when the retention member is moved by the pyrotechnic actuator.

16. The pedal assembly according to claim 1, further comprising a retaining plate fixed to a body of the pedal, the retaining plate demarcating at least part of the retaining housing.

17. The pedal assembly according to claim 16, wherein the retaining plate is welded to the body of the pedal.

18. The pedal assembly according to claim 1, further comprising an additional part through which the rotating shaft passes, the additional part including a housing which, under normal operating conditions, is arranged facing the retaining housing of the pedal, the retention member being at least partially housed in a cavity formed by the retaining housing of the pedal, the housing of the additional part and the cavity being configured to guide the movement of the retention member when the actuator acts on the retention member after the head-on collision.

19. The pedal assembly according to claim 18, wherein the additional part is overmolded onto the rotating shaft.

20. A motor vehicle comprising a pedal assembly, the pedal assembly including a support configured to be attached to the motor vehicle; a rotating shaft coupled to the support; a pedal having a first end and a second end, the second end including a retaining housing and an opening, under normal operating conditions the rotating shaft being arranged in the opening; a retention member that, under normal operating conditions, retains a portion of the pedal against the rotating shaft so that the pedal can pivot with respect to the support on the rotating shaft, a portion of the retention member being at least partially housed in the retaining housing supported against the rotating shaft to retain the rotating shaft in the opening of the pedal; and an actuator that, in the event of a head-on collision, is configured to act on the retention member to move the retention member so that the portion of the pedal is no longer retained against the rotating shaft, the pedal being at least partially released from the support.

* * * * *